(12) United States Patent
Haider

(10) Patent No.: US 6,498,639 B1
(45) Date of Patent: Dec. 24, 2002

(54) DEVICE AND METHOD FOR EXPOSING A DIGITAL IMAGE ONTO LIGHT-SENSITIVE MATERIAL

(75) Inventor: Peter Haider, Munich (DE)

(73) Assignee: Agfa Gevaert Aktiengesellschaft, Leverkusan (DE)

(*) Notice: Subject to any disclaimer, the term of this patent is extended or adjusted under 35 U.S.C. 154(b) by 172 days.

(21) Appl. No.: 09/625,457

(22) Filed: Jul. 26, 2000

(30) Foreign Application Priority Data

Aug. 7, 1999 (DE) .......................... 199 37 417

(51) Int. Cl.⁷ .......................... G03B 27/52; G03B 27/72
(52) U.S. Cl. .......................... 355/40; 355/67; 348/771
(58) Field of Search .......................... 355/32, 40, 67; 353/30, 33, 37, 98; 348/771; 359/618; 347/238, 239, 241

(56) References Cited

U.S. PATENT DOCUMENTS

| 5,105,299 | A | | 4/1992 | Anderson et al. ............ 359/223 |
| 5,164,854 | A | | 11/1992 | Takanashi et al. ........... 359/256 |
| 5,424,868 | A | * | 6/1995 | Fielding et al. ............. 359/634 |
| 5,636,001 | A | * | 6/1997 | Collier ........................ 355/38 |
| 5,704,701 | A | | 1/1998 | Kavanagh et al. ............ 353/33 |
| 5,796,508 | A | * | 8/1998 | Suzuki ........................ 345/84 |
| 5,796,526 | A | | 8/1998 | Anderson .................... 359/671 |
| 5,801,814 | A | | 9/1998 | Matsumoto .................... 355/40 |
| 6,163,363 | A | * | 12/2000 | Nelson et al. ............... 347/224 |
| 6,246,446 | B1 | * | 6/2001 | Heimbuch et al. ........... 348/744 |

FOREIGN PATENT DOCUMENTS

| DE | 4211128 | 6/1996 |
| EP | 0922986 | 6/1999 |
| EP | 1031874 | 8/2000 |

* cited by examiner

Primary Examiner—Alan A. Mathews
(74) Attorney, Agent, or Firm—Milde & Hoffberg, LLP

(57) ABSTRACT

The invention relates to a device for exposing a digital image onto light-sensitive material. Prior to exposure, the digital image is split into n partial digital images (n≧2) whose data is passed on to a control unit. According to the data, this unit controls n reflective light modulators that can be controlled pixel by pixel such that n partial images are generated at these light modulators that are illuminated by an illumination unit. The partial images are reproduced onto the light-sensitive material using an objective. In order to join the partial images into a total image, a prism or beam splitter complex is designed and arranged between the illumination unit, light modulators and reproducing objective such that both the illumination and the reproducing beam paths pass through it.

12 Claims, 3 Drawing Sheets

DEVICE AND METHOD FOR EXPOSING A DIGITAL IMAGE ONTO LIGHT-SENSITIVE MATERIAL

BACKGROUND OF THE INVENTION

The invention relates to a device and a method for exposing a digital image onto light-sensitive material, which includes a computer unit for splitting the digital image into n partial digital images, where n≧2, at least one control unit for controlling n reflective light modulators, pixel by pixel, for generating the n partial images, an illumination unit for illuminating the light modulators and an objective for reproducing the partial images onto the light sensitive material. Such devices and methods are known from various references dealing with digital exposure devices.

The German Patent No. 42 11 128 discloses one example that describes an image transfer method. With this method, an image original is scanned point by point and line by line, the individual signals are digitized and the digital image signals are reproduced on photographic paper via an optical system using a light modulator that is illuminated by a light source.

In particular, with such exposure devices it has also been known to split the digital images into partial images. Each partial image is then displayed on a light modulator. Using an optical system, the partial images are reproduced next to one another on the light-sensitive material resulting in the total image being presented on this material. Because the resolution of the light modulator must always be sufficient only for a part of the image, even larger images can be exposed in this manner with a sufficient resolution without the need to use expensive extreme high-resolution image generation devices. However, with this procedure it is always problematic to reproduce those areas where the partial images connect such that no density jump occurs in the image.

One example for such an exposure method is described in the U.S. Pat. No. 5,801,814. Here, the original digital image is split into numerous partial images. One after the other, the partial images are generated using an LCD and exposed onto the light-sensitive material one next to the other using a projection lens system. Placing the partial images of the LCD image next to one another to combine them to a total image on the light-sensitive material is accomplished such that either the LCD, the objective, a beam splitter inserted into the beam path or the light-sensitive material is moved between the exposures of the partial images. To avoid density jumps in the connecting zones of consecutive partial images, the partial images are exposed overlapping by a few pixels. In the overlapping area, the density of the pixels of each partial image is then reduced inversely proportional to the number of overlapping partial images. For a precise recalibration of varying densities transmitted by individual pixels, sensors are inserted into the beam path of the LCD's overlapping areas prior to exposure of the images, such that the pixels with multiple exposure can be measured and corrected.

This method is suitable for exposure processes where a fast production of many images is not required. For example, it lends itself to the generation of infrequent index prints between the standard exposures. In this case, the time loss resulting from the consecutive exposure of partial images and also the calibration required between exposures can be tolerated. However, with this method, the exposure of an entire digital image takes too much time to be used in a photographic reproduction device where images are to be exposed continuously.

Another system, which is particularly suitable for a line exposure device for consecutive exposure of two partial images is described in the, U.S. Pat. No. 5,105,299. Here, two lines arranged underneath one another of a DMD (so-called Digital Micromirror Device or Deformable Mirror Device) are illuminated by a lamp and the light is modulated by the small mirrors of the DMD according to the image data such that one half of the image line is generated on each DMD line. The modulated and reflected light of the two image line halves is redirected using an optical system consisting of reflective prism surfaces, such that lines that are located underneath one another in the object, each representing one image half of a line, are displayed next to one another in the image. This results in a consecutive line on the material to be exposed.

In the same manner as with all other digital exposure devices, where on paper partial images are combined to a total image, the problem of a density jump at the connecting edges of the partial images occurs, of course, here as well. However, the patent document does not deal with this problem.

A particular problem of this arrangement stems from the fact that the illumination and reproduction beam paths must be spatially separated sufficiently such that the reproduction beam path is not vignetted by the illumination optics. This spatial separation prevents a compact design of the exposure system.

This problem is addressed by the device disclosed in the U.S. patent application Ser. No. 09/495,802. This device combines the light reflected by two DMDs by means of a beam splitter. The DMDs are arranged on both sides of the beam splitter such that the light of one DMD passes through one half of the beam splitter. The light of the other DMD is reflected by the second half such that images generated by the DMDs are reproduced next to one another on the light-sensitive material. For the illumination, a light source that illuminates the DMDs passing by the beam splitters and the reproducing objective is provided for each DMD. To correct the connecting area of the consecutively reproduced partial images, this application recommends to partially decouple the combined partial images from the reproduction beam path using a beam splitter. The decoupled light is guided to a sensor where the exposure in the connecting zone is monitored for uniformness. In this manner, a continuous correction of the density in the connecting zone can be carried out even during the exposure. Similar to the previous arrangement, the disadvantage with this one is also that a very compact design is impossible because the illumination and reproduction beam paths must be spatially separated. Furthermore, it is problematic with such designs to adjust the two light modulators such that their images connect precisely on the photographic paper.

SUMMARY OF THE INVENTION

It is, therefore, the principal objective of the present invention to develop a device for exposing digital images, where partial images generated at various light modulators are reproduced simultaneously next to one another on light-sensitive material, such that, with a compact, adjustment-friendly design of the device, no density jumps occur at the connection areas of the partial images.

This objective, as well as other objectives which will become apparent from the discussion that follows, are achieved according to the invention by a device and a method wherein the generated partial images are combined by a prism or a beam splitter complex, arranged between the illumination unit, light modulators and the objective, such that both the illumination and the reproduction beam path pass through it.

A very compact design of the exposure device can be accomplished by the arrangement of beam splitters or beam splitter prisms between the illuminating unit, light modulator and reproduction objective according to the invention, because both the illumination and the reproduction beam paths can be directed through the beam splitters or prisms. By directing the beams in this manner, it is possible to attach the reflecting light modulators directly to the complex that combines the partial images. On one hand, this makes possible the extremely compact design of the exposure device, and on the other hand, it becomes comparatively easy to adjust the light modulators due to the attachment of the light modulators on the complex. For example, using a glass adhesive they can be placed on the complex in a movable fashion and then moved around until an uninterrupted total image is achieved when reproducing a test image on the light-sensitive material. Thereafter, the glass adhesive is hardened. Once adjusted, the light modulators remain in a fixed position on the complex; even the replacement of components of the exposure device, for example, of the illumination unit or the objective, would not require a new adjustment.

When using prism complexes, these are designed and arranged such that beams emitted by the illumination device strike the prism interface at such a small angle that they are completely reflected onto the light modulator at the respective interface at the transition to the optically thinner medium. The beams reflected by the light modulator strike the interface of the beam splitter prisms at a different angle than the incident beams such that they can pass the interfaces. During the transmission, the beams are deflected such that behind the beam splitter prisms together with beams reflected by other light modulators they result in a common beam bundle, which exposes an uninterrupted image onto the light-sensitive material.

DMDs (Digital Micromirror Devices), VFDs (Vacuum Fluorescence Displays), reflective LCDs, GLVs (Grating Light Valves) or any other reflective light modulators can be used as the light modulators.

Depending on the design and arrangement of the beam splitter complex and the illumination design, partial images of any desired number of light modulators can be combined. Although an even number of light modulators is easier to implement for symmetry reasons, basically an uneven number of light modulators can be combined as well.

Both physical and geometrical beam splitters are conceivable for beam splitting. Metallic physical beam splitters have the advantage that regarding the color, they barely alter the split beam, such that the combined image does not require color correction; however, their disadvantage is a high light loss.

All potential multi-color light sources, such as halogen lamps or LEDs, whose light can be combined in a common beam path using a beam splitter are suitable as illumination units. For the illumination, it is only important that the light for all light modulators originates from the same light source, if at all possible. Depending on the design of the beam splitter complex, the light of the illumination unit can be directly directed to the light modulators, or the light of the illumination unit is initially split by additional beam splitters such that several virtual images of this one light source are generated that each illuminate one light modulator. The advantage of having only one illumination unit for illuminating several light modulators is that changes of the illumination unit affect all partial images generated by the light modulators in the same manner, such that no density jumps due to differing fluctuations at the connecting edges of the partial image are recognizable in the total image.

The design of illumination unit, illumination optics, beam splitter complex, light modulators as well as reproduction optics should be symmetrical such that both the beam paths that illuminate the light modulators and the light paths that reproduce the image generated at the light modulators onto the light-sensitive material have the same length for each light modulator. This is the prerequisite for a Köhler beam path to be realized. For this, an illumination optics must be designed and arranged such that the image of the light source is reproduced in the pupil of the reproduction optics and the reproduction optics must be designed such that the pupil of the illumination optics at the same time becomes the port of the reproduction optics. Such a beam path ensures that no location information of the lamp is transferred into the image. Eliminating any location information and using only one light source prevents time-related changes that occur locally at one place in the lamp from being visible at the edge of a partial image but not at the edge of the connecting one, which would result in density jumps at the connecting area.

In place of the implementation of a Köhler beam path, the beam path for preventing density jumps can also be designed such that the light reproducing the connecting area of the partial images stems from the same place of the illumination unit.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
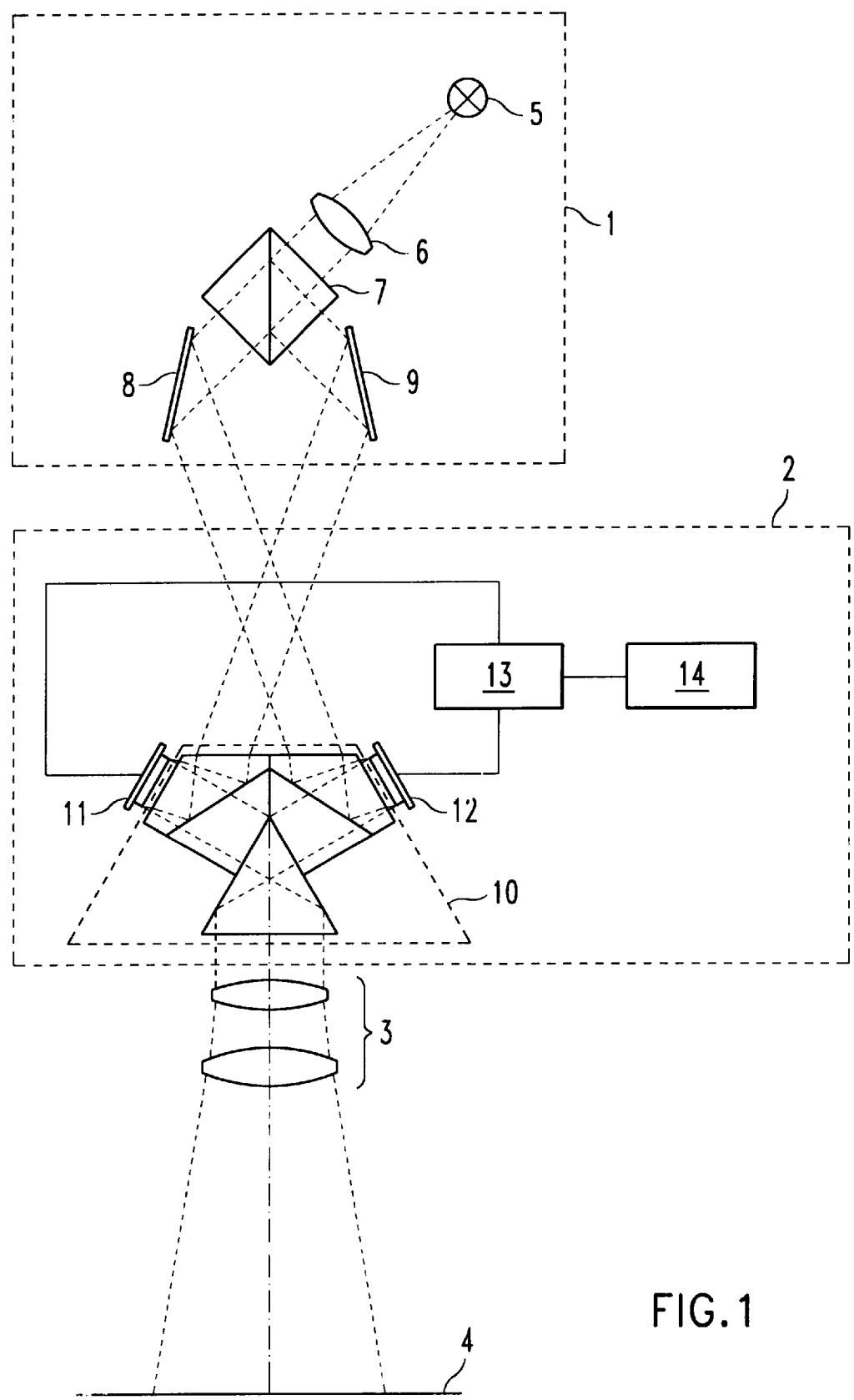
FIG. 1 is a schematic diagram of a digital exposure device according to the invention, where the reproduction and the illumination beam paths are guided through a beam splitter prism complex.

The preferred embodiments of the present invention will now be described with reference to FIGS. 1–3 of the drawings. Identical elements in the various figures are designated with the same reference numerals.

FIG. 1 shows an illumination unit 1, whose light is directed to an image generation unit 2, where the light is modulated such that an image is generated, which is exposed onto photographic paper 4 through the reproduction optics 3. The illumination unit exhibits a light source 5 that emits multi-colored light.

Suitable light sources are, for example, halogen lamps or red, green and blue LEDs, whose light is combined into one beam path via dichroitic mirrors. Via an illumination optics 6, the light of the light source is directed to a beam splitter 7, where the light is split into two symmetric beam paths such that two separate light paths are created across the mirrors 8 and 9. The light reflected by the mirrors is redirected by a beam splitter prism complex 10 and directed to reflective light modulators 11 and 12. In the exemplary embodiment, DMDs are used as reflective light modulators. However, in principle, any reflective light modulator can be used with this design. The light modulators are controlled according to image data as determined by a computer unit 14 using a control unit 13, such that said modulators reflect the incident light according to the image data pixel by pixel either into or away from the reproduction beam path. From the two DMDs, the modulated light reflected into the reproduction beam path is in one reproduction beam path, each again directed into the prism complex 10, from where it is redirected such that the two reproduction beam paths are combined to one beam path. A beam path exits the prism complex that exposes the photographic paper 4 via the reproduction optics 3, such that a reproduction of the digital image is generated on said photographic paper.

The computer unit 14 splits the digital image into two partial images such that only a portion of the total image must be generated by each of the DMDs. The partial images generated by the DMDs are then combined on the photographic paper to a total image using the reproduction system. With this method, it is possible to generate an image with higher resolution than would be possible when reproducing the total image with only one DMD. However, it should be noted here that no density jumps are permitted at the place where the partial images connect. To avoid this, the device must be adjusted and calibrated such that the edge pixels of both DMDs connect precisely and that in the connection area precisely the same amount of light is transferred from both DMDs. Furthermore, it must be ensured that changes of the light source affect the pixels of both DMDs that correspond to the connecting area equally.

These requirements are met by generating an identical virtual image of the light source by the beam splitter in the illumination unit. The light emitted by the light source and from the virtual image each illuminates one DMD such that potential changes of the light source affect both DMDs identically. To ensure that not only the total amount of light is the same for each DMD but that also each DMD is illuminated uniformly, it is preferable to eliminate any location information of the lamp. For this purpose, it must be ensured that from each place of the lamp light falls onto each pixel of the DMD. This condition is met in the pupil of the illumination optics. The condition for a uniform illumination of the object is met once this pupil concurs with the object to be reproduced (here, the DMDs). When both beam paths have exactly the same length, the beam path can be designed such that a Köhler illumination pattern is realized. A Köhler illumination pattern is described in optics textbooks (e.g., Gottfried Schröder, *Technische Optik* [Technical Optics], 7$^{th}$ Edition, 1990, pages 152–153).

With such a beam splitter complex, it is, of course, just as well possible to combine more than two partial images to a total image. One possible embodiment for combining four partial images to a total image is presented in FIG. 2. The partial images to be reproduced are generated at four DMDs 15, 16, 17 and 18. To this end, the DMDs are illuminated by an illumination unit that is designed such that a true light source is reproduced via interim images onto four virtual images with all light source images being identical.

The generation of partial images is carried out by reproducing light of a light source 19 via an objective 20 onto a first beam splitter 21. This beam splitter generates a virtual image of the light source. Via two redirecting mirrors 22 and 23, the light from the virtual image and from the light source is directed to two additional beam splitters 24 and 25. The beam splitters generate additional virtual images. The redirecting mirrors 26, 27, 28 and 29 direct their beam bundles to the beam splitter complex 30, where the DMDs are located as well. In the beam splitter complex, the illumination beams are reflected onto the DMDS, where they are modulated according to the image data of the respective partial image. The light modulated and reflected by the DMD passes again through the beam splitter complex, where it is redirected such that the light reflected by the four DMDs is combined to one total beam, where the partial beams of the four partial images are located next to one another without overlapping or gap. This design also ensures that all four illumination beam paths have the exact same length such that the Köhler beam path can be realized.

In place of this geometric beam splitter complex, it is just as well possible to use a complex of physical beam splitters. One possible complex of physical beam splitters that accomplishes the task of the invention is presented in FIG. 3. The partial images generated by DMDs 34, 35, 36 and 37 are combined to a total image at partially transmissive surfaces 31, 32, and 33. A total image consisting of four consecutive partial images is then generated on the photographic paper. In this manner, the initial resolution that would result by using only one DMD can be quadrupled in one direction.

To increase the resolution also in the other dimensions, it would be possible to attach additional DMDs—shown as dotted lines in the drawing—on the beam splitter complex. These are arranged above or below the drawing plane such that their images come to be placed on the photographic paper next to the four images of DMDs 34, 35, 36, 37 arranged in one line.

In principle, this system can be expanded as needed by always adding additional DMDs in an additional plane.

The number of DMDs to be reproduced can be increased also in the drawing plane. To this end, the DMDs on one side of the beam splitter must be placed at a distance to one another with the distance being a multiple of the DMD length. In this manner, gaps are created in the image that are filled with images of DMDs of other beam splitter sides.

Figure 2:
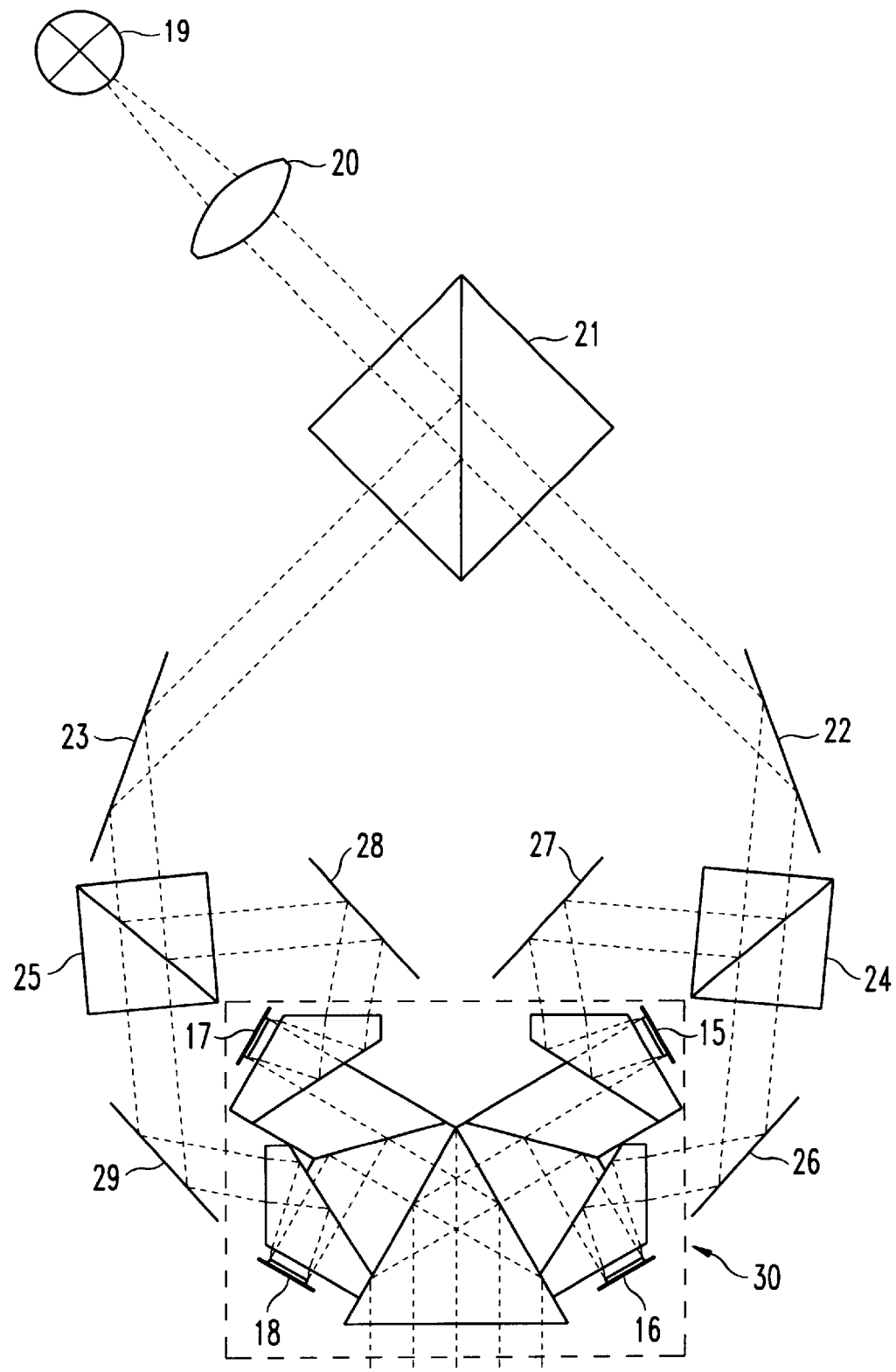
FIG. 2 is a schematic diagram of a beam splitter complex with geometric beam splitters, wherein more than two light modulator images are combined.
Figure 3:
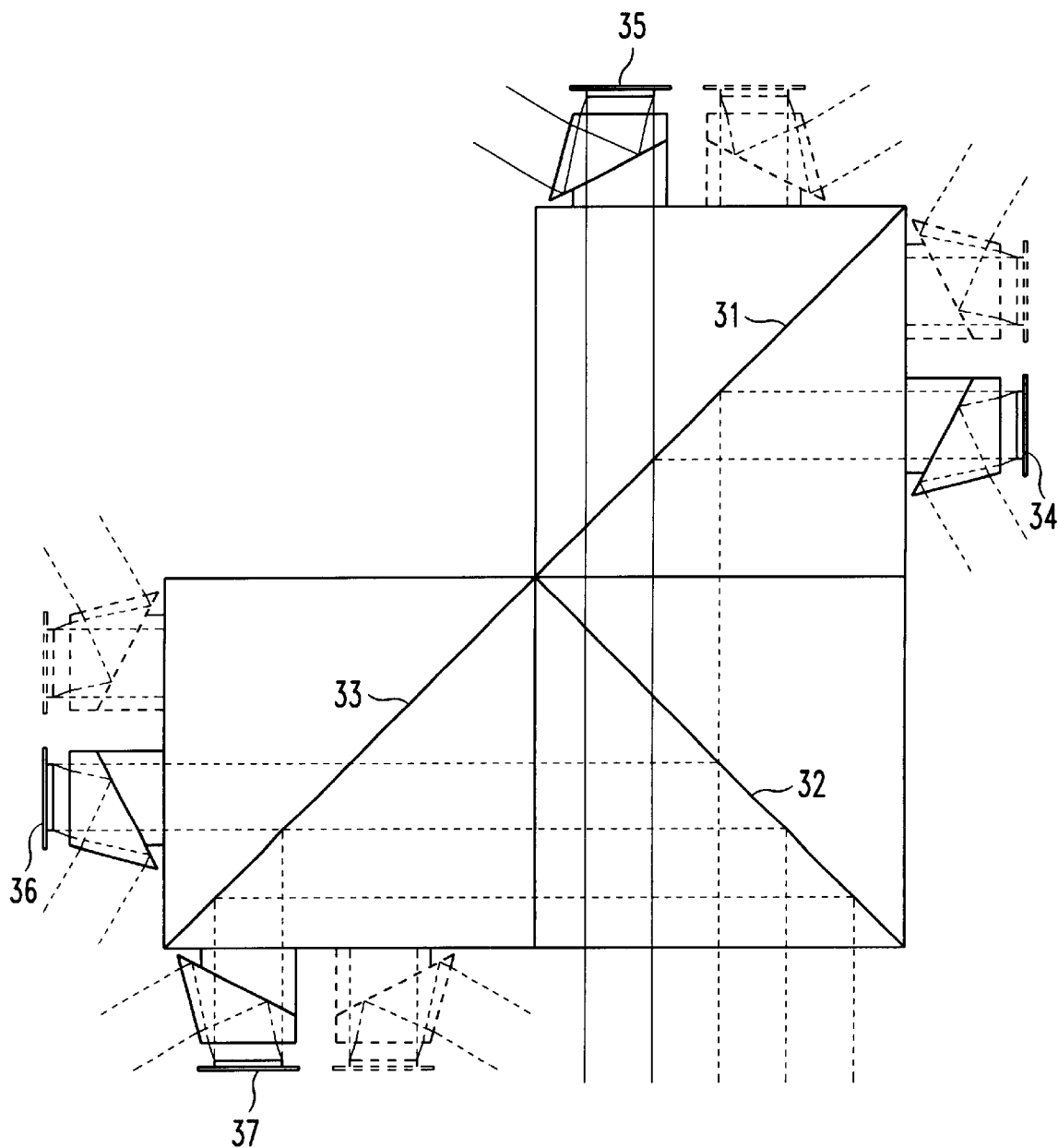
FIG. 3 is a schematic diagram of a beam splitter complex with physical beam splitters, wherein more than two light modulator images are combined.

A similar expansion is also possible for the design described in FIG. 2.

There has thus been shown and described a novel device and method for exposing a digital image onto light-sensitive material which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An apparatus for exposing a total digital image onto light-sensitive material comprising a computer unit for splitting the total digital image into n separate, partial digital images (n≧2), at least one control unit coupled to the computer unit for controlling n reflective light modulators, pixel by pixel, for generating the n partial images, an illumination unit for illuminating the light modulators and an objective for reproducing the partial images onto the light-sensitive material to form the total image, the improvement comprising a prism or a beam splitter complex for combining the partial images, arranged between the illumination unit, light modulators and the objective, such that both the illumination and the reproduction beam path pass through said complex.

2. Apparatus as set forth in claim 1, wherein the light modulators are attached directly on the prism or beam splitter complex.

3. Apparatus as set forth in claim 2, wherein the light modulators are DMDs.

4. Apparatus as set forth in claim 1, wherein beam splitters are provided for splitting the illumination unit into n images of the illumination unit each illuminating one light modulator.

5. Apparatus as set forth in claim 4, wherein the illumination unit includes LEDs.

6. Apparatus as set forth in claim 1, wherein two light modulators and the prisms of the prism complex are arranged symmetrically to the optical axis.

7. Apparatus as set forth in claim 1, wherein three light modulators and the prisms of the prism complex are arranged symmetrically to the optical axis.

8. Apparatus as set forth in claim 1, comprising four light modulators and beam splitter blocks with physical beam splitters.

9. Apparatus as set forth in claim 1, wherein the illumination unit, light modulators and objective are arranged in a Köhler beam path.

10. In a method for exposing a total digital image onto light-sensitive material, wherein the digital image is split into n separate, partial digital images (n≧2); wherein visible partial images are generated by these partial digital images on n reflective light modulators that can be controlled, pixel by pixel, and are illuminated by an illumination unit; and wherein the generated partial images are reproduced, one next to another, by an objective onto the light sensitive material to form the total image, the improvement wherein the generated partial images are combined by a prism or a beam splitter complex which directs the light of the illumination unit onto the light modulators.

11. Method as set forth in claim 10, wherein several images of the illumination unit are generated by beam splitters.

12. Method as set forth in claim 10, wherein the light modulators are directly attached to the prism or beam splitter complex.

* * * * *